United States Patent Office
2,973,173
Patented Feb. 28, 1961

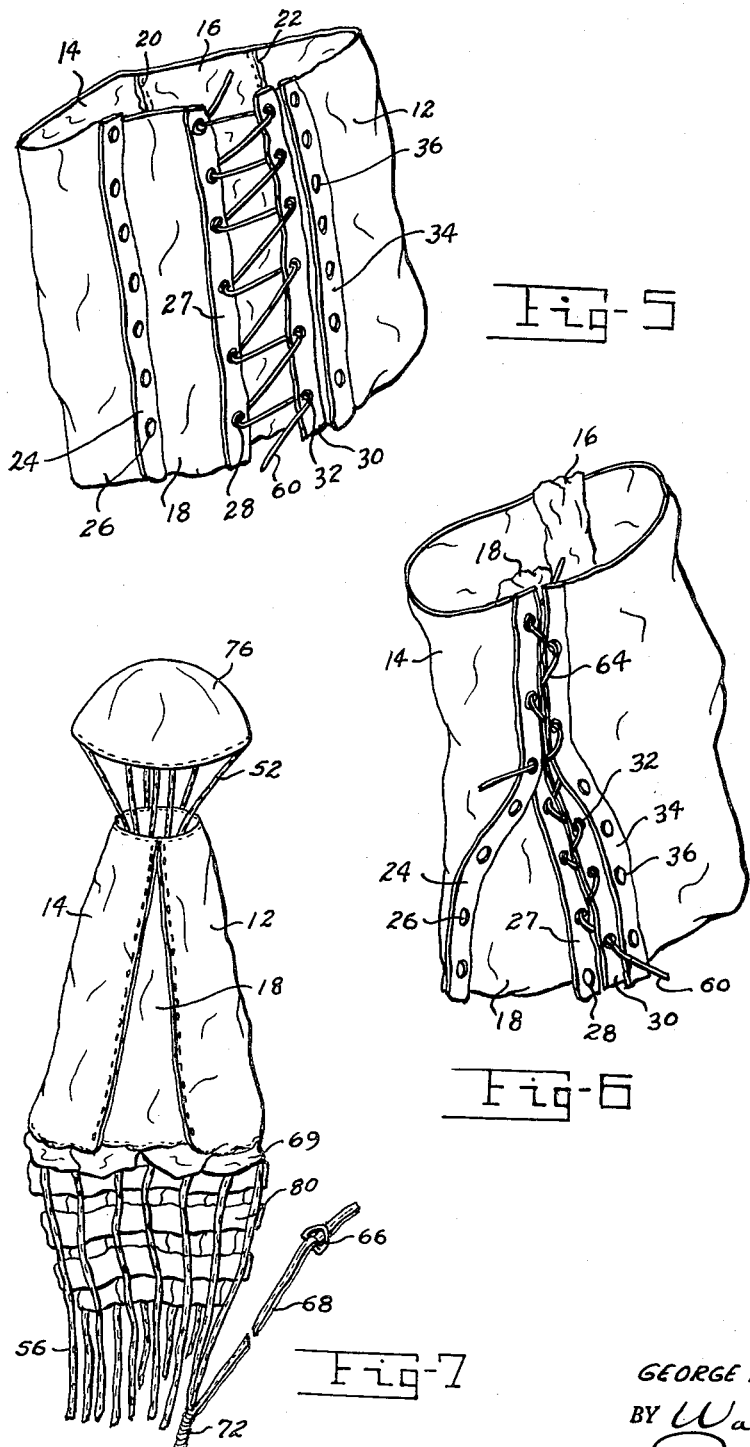

2,973,173
BELLOWS DEPLOYMENT BAG
George A. Zelinskas, 434 Alaska St., Dayton, Ohio Filed Aug. 15, 1958, Ser. No. 755,360

5 Claims. (Cl. 244—148)

(Granted under Title 35, U.S. Code (1952), sec. 266)

The invention described herein may be manufactured and used by or for the United States Government for governmental purposes without payment to me of any royalty thereon.

This invention relates to a bellows deployment bag and, more particularly, to a deployment bag which is compacted after packing for conservation of space, and which is automatically decompacted for orderly parachute deployment when the bag with its load is dropped.

In releasing parachutes at extremely high speeds and heavy loads, very hazardous conditions are encountered because of the necessity of compacting parachutes for space saving purposes. When deployments are made from small compacted bags, burning, abrasion and other damage to the parachute may occur. The skirt may choke, causing partial or complete failure of deployment.

The object of the present invention is to provide a deployment bag which during packing is laid open in substantially flat condition allowing ample space for convenient and proper stowing of the parachute, and which is then laced into the form of a bag and thereafter further compacted so that the parachute and bag will occupy a minimum amount of space in the aircraft.

A further object of the invention is the provision of means whereby decompacting of the bag is brought about when the parachute is dropped from the plane by a bellows action, and the bag is automatically enlarged to provide proper deployment.

A still further object of the invention is the provision of a parachute deployment bag which lies in comparatively flat condition while the parachute is being packed, is thereafter laced into deployment bag formation from which formation successful deployment may be accomplished, and thereafter further compacted.

Another object of the invention is the provision of a deployment bag wherein outer compacting lacings are severed early in the deployment sequence, expanding the bag by bellows action to a size such that orderly and successful deployment can take place without choking of the skirt and without damage resulting from burning and abrasion.

Further objects and advantages will appear as the description proceeds.

In the drawing:

Fig. 3 is a view of the bag completely compacted with inner and outer lacings completed.

Fig. 4 is a fragmentary view of the midsection of the bag, showing the lanyard and cut knives for releasing the outer compacting lacings.

Fig. 5 is a fragmentary view of a portion of the deployment pack showing the initial lacing which effects a formed parachute pack.

Fig. 6 is a fragmentary view of the deployment pack showing the second lacing, i.e., the step of compacting.

Fig. 7 is a schematic view of the deployment pack in expanded condition showing the parachute and shroud lines partly deployed.

Figure 1:
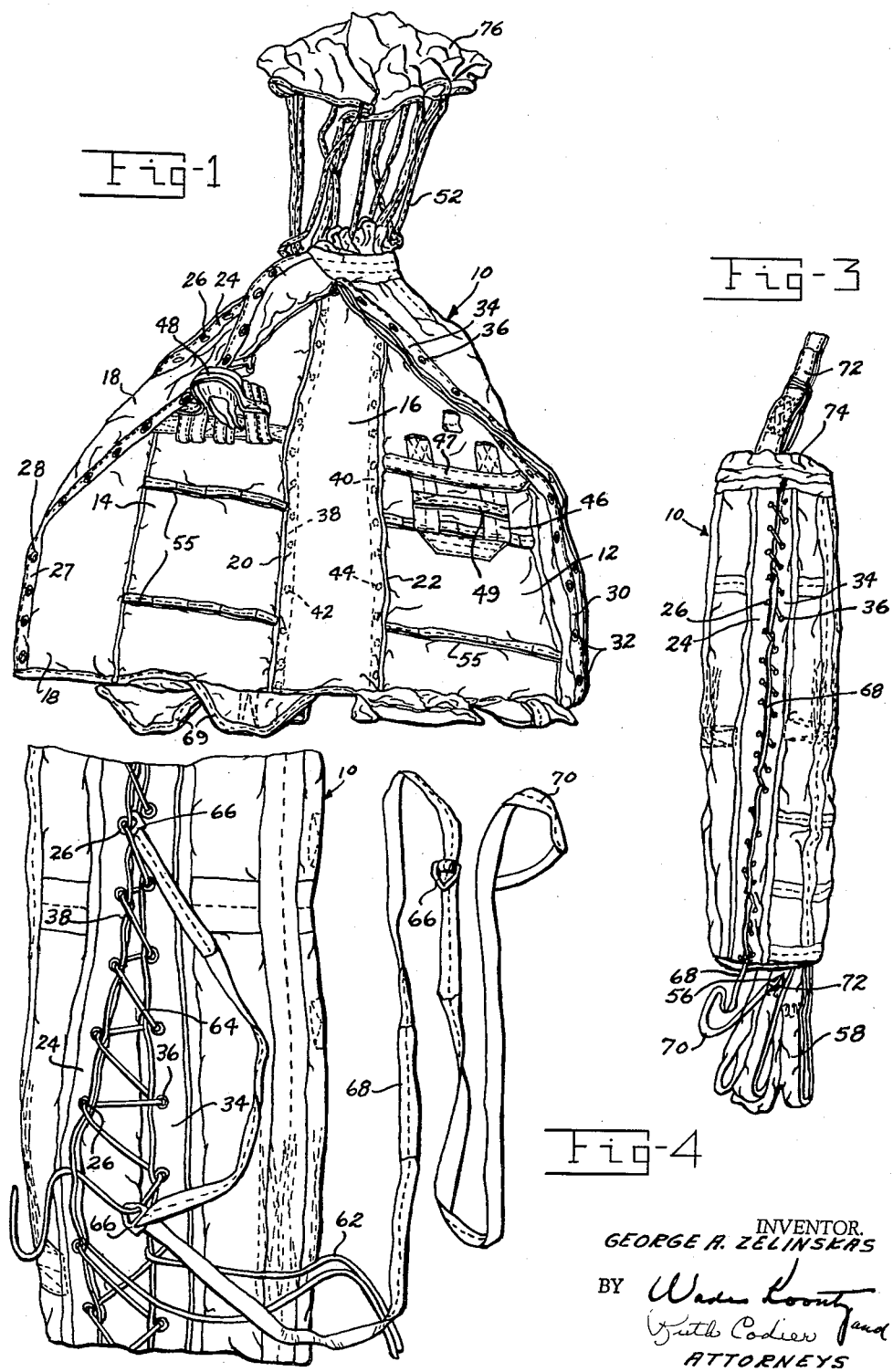
Fig. 1 is a view showing the interior of the bag laid open for receiving a parachute.

Referring more in detail to the drawing, the deployment bag is represented generally by the numeral 10. The bag or body portion 10 is made up generally of four sections, two side pieces 12 and 14, and two gussets or inserted panel members or bellows or strip sections 16 and 18. As shown best in Figs. 1 and 5, longitudinal edges of the gusset or bellows section 16 are sewed to the adjacent edges of the side sections. The interior seams are shown at 20 and 22. The gusset or bellows section 18 is sewed to the section 14 adjacent the edge, leaving a flap 24 which is provided with eyelets 26. The outer edge of the bellows section 18 is provided with eyelets 28.

The side section 12 is provided with double flaps at its edge, an inner flap 30 having eyelets 32 and an outer flap 34 having eyelets 36.

The inner edges of the sections 12 and 14 are provided with flaps 38 and 40 and eyelets 42 and 44, shown in phantom in Fig. 1.

The members 24, 27, 38 and 40, termed flaps, are narrow hem elements whose function is to provide a location for lacing eyelets. They are narrow double folds of material properly reinforced for this purpose. The bellows members 16 and 18, on the other hand, provide sections of material of such comparatively greater width that their compression and expansion provide both a highly compacted bag for limited-space stowing (Fig. 3) and a deployment bag sufficiently expanded to allow successful deployment of a parachute therefrom (Fig. 7).

Figure 2:
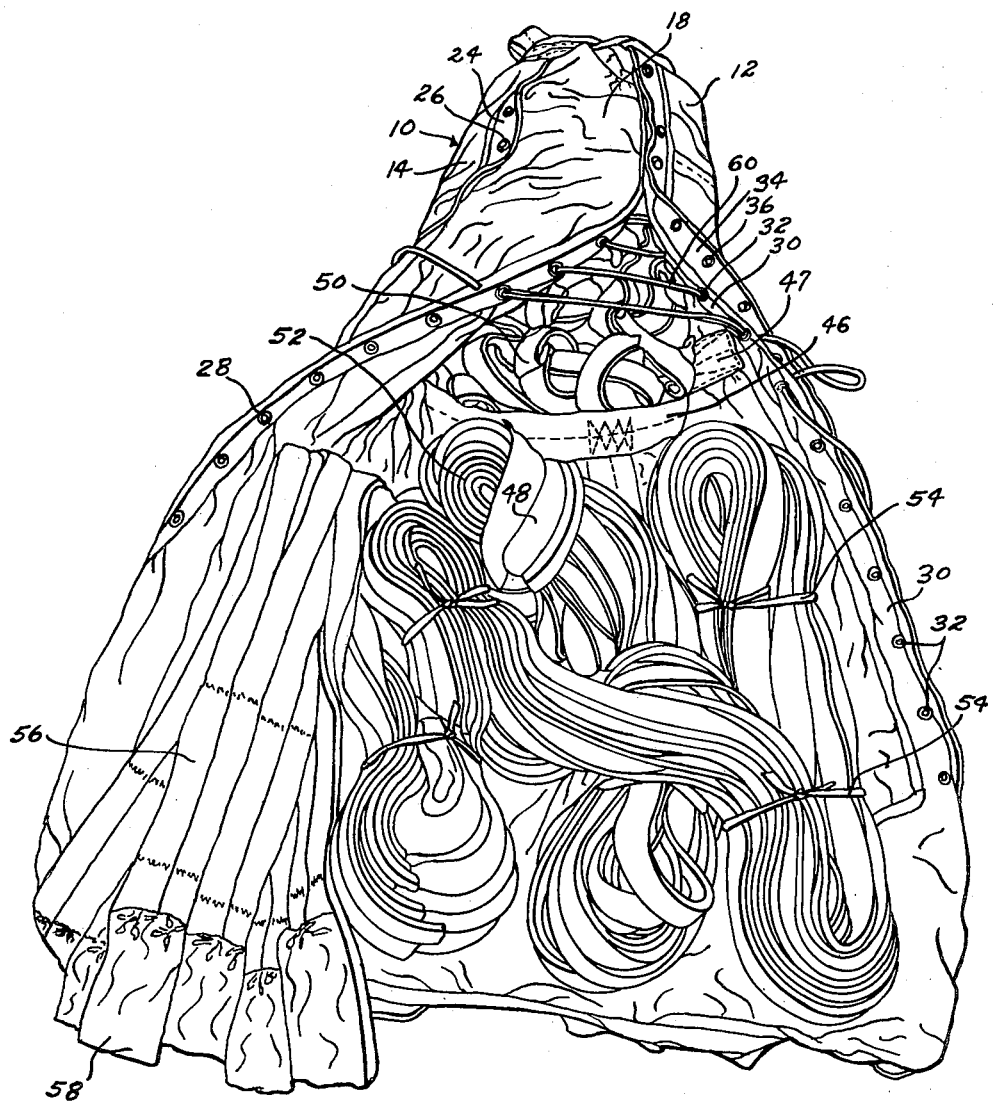
Fig. 2 is a view of the bag with a ribbon parachute and shroud lines stowed and ready for initial lacing.

In the interior of the bag are located a U-loop 46 and a locking loop 48. The legs of the U-loop 46 are anchored to the bag by strap 47 and are supported by the cross strap 49. In Fig. 2 is shown a ribbon parachute 50 stowed in the upper end of the bag 10, which is partially laced in a manner presently to be described. The locking loop 48 is drawn through the U-loop 46. Then the first loop 52 of the grouped shroud lines, i.e., the area of the shroud lines lying nearest adjacent the skirt of the parachute, is drawn through the locking loop 48. The subsequent loops are tied down by means of the frangible tacking 54, which are inserted through loops 55 provided on the interior surface of the pieces 12 and 14. It will be seen that no deployment of the parachute skirt is possible until the entire length of the shroud lines has been deployed, and the shroud line loop 52 withdrawn from the locking loop 48. The opposite ends of the shroud lines, represented by the numeral 56, are attached to cables 58 which are attachable by hooks or other suitable means (not shown) to a load (not shown).

During the first stages of packing, the bag will be laid out substantially flat as shown as Fig. 1. As the packing proceeds to the stage shown in Figs. 2 and 5, a permanent lacing 60 is inserted alternately and consecutively through eyelets 28 and 32 located respectively on the flap 27 of the bellows member 18 and the inner flap member 30. This lacing is continued until the lower end is reached, and the lacing 60 is anchored in any suitable manner (not shown). The bag is now in deployment bag formation and the parachute is deployable therefrom in this condition. For purposes of space conservation, however, the bag is further compacted, and this is done by the following means: A temporary lacing 62 is drawn alternately and consecutively through eyelets 26 and 36 on flaps 24 and 34 respectively, beginning at the top. This lacing is gradually withdrawn while a permanent lacing 64 is being threaded into the eyelets 26 and 36 to take its place. While the permanent lacing 64 is being threaded into the eyelets 26 and 36, a series of cut knives 66 are threaded onto the lacing 64 at intervals. The interval in practice is of the order of 5 or 6 inches. The cut knives 66 are carried on a lanyard or similar cord 68. The temporary lacing 62 is used to draw the flaps 24 and 34 together and effect the compacting of the bag in preparation for applying the permanent lacing 64 and simultaneously threading cut knives 66 thereon. They are rendered operative to cut the lacing 64 by a forced pull on the lanyard 68. This pull may be supplied by securing the end of the lanyard to a stationary point in the plane, such as the interior of the compartment into which the compacted bag is stowed or, as shown in Fig. 3, an end loop 70 of the lanyard 68 is permanently secured to a loop of shroud line, as shown at 72. The cut knives 66 are tucked inside the bag, between the meeting edges 24 and 34.

It will be seen that the bellows member 18 is thus compacted, and the flaps 24 and 34 drawn closely together over it. The bellows member 16, located on the opposite side of the bag is compacted in the same manner. The flaps 38 and 40, shown in phantom in Fig. 1, are drawn together, first by a temporary lacing (not shown) similar or identical to the temporary lacing 62, and later replaced by permanent lacing, cut knives and lanyard (not shown) similar or identical to the lacing 64, cut knives 66 and lanyard 68.

In practice, after compacting of the bag, the cables or shroud lines 58 are tucked inside the lower end of the bag and the flaps 69 closed loosely over them. Just before launching, the cables 58, which are supplied with hooks or other means (not shown), are withdrawn and attached to the load which is to be dropped. It will now be apparent that when the load, with the compacted parachute attached, is dropped from the aircraft, the static line 72 and cap 74 are separated from it. The pilot parachute 76, which was stowed inside the top of the bag, is released. The method of attaching the cap 74 is not shown and may be any expedient means. Likewise, the deployment of the pilot parachute 76 may be any workable device, such as the figure eight strap spring device shown in the patent to Morgan 2,483,425. The load is now falling against the drag of the pilot chute 76 and the shroud lines now begin deploying. When this occurs, the lanyard 68 and its companion on the opposite side of the bag (not shown), also being tacked to the shroud lines, will be forcefully pulled downward. The cut knives will sever the lacings 64 together with the companion lacings on the opposite side (not shown) and the two bellows members 16 and 18 will reach their full expansion. The bag will now be in expanded condition and orderly deployment of the parachute may now take place from it without burning or abrasion, and without danger of choking of the skirt 80, shown in Figs. 2 and 7 as a ribbon parachute skirt. It is evident that, while two bellows members are shown, one, or any number may be used. It is also evident that, although a ribbon parachute is described in this disclosure, the invention is not limited to this type of parachute.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A device for compacting parachute deployment bags and their enclosed parachutes for stowing, and decompacting said bags and parachutes for high speed launching, comprising a body member, longitudinal edges on said body member, a bellows member and an outer eyelet carrying flap on one of said longitudinal edges, an inner eyelet carrying flap and an outer eyelet carrying flap on the other of said edges, eyelets on the outer longitudinal edge of said bellows member, a first lacing for engaging in the eyelets on said bellows member and said inner flap for drawing the edge of said bellows member into adjacent relationship to said inner flap, and thereby forming a deployment bag capable of successfully deploying a parachute stowed therein, a second lacing engaging alternately into the eyelets on said outer flaps for drawing them together into adjacent relationship, thereby compressing said bellows member and compacting said bag and the parachute contained therein, a shroud line on said parachute, a lanyard secured at one end to said fold of a shroud line, cut knives secured to said lanyard at intervals, said cut knives threaded onto said second named lacing and in cutting relation to said lacing whereby the pulling stress placed on said lanyard when said shroud lines deploy, will cut said second lacing and allow said deployment bag to expand for unimpeded deployment of said parachute.

2. A device for compacting parachutes for stowing, and decompacting them for high speed launching, comprising a body member, longitudinal edges on said body member, a longitudinally disposed and laterally distending bellows member and a comparatively narrow outer flap on one of said longitudinal edges, an inner flap and an outer flap on the other of said edges, means for drawing and holding the edge of said bellows member into adjacent relationship to the inner flap, thereby forming a bag capable of deploying a parachute, means for drawing and holding said outer flaps into adjacent relationship, thereby compacting said deployment bag and the parachute contained therein for stowing purposes, means for severing said last named holding means for decompacting said deployment bag and the parachute contained therein for unimpeded deployment of said parachute.

3. A device according to claim 2 wherein said last named drawing and holding means comprises a lacing, and wherein said severing means comprises cut knives threaded onto said lacing at intervals along the longitudinal length of said deployment bag in cutting relation to said lacing, a lanyard connected to said cut knives at intervals along its length, and secured at its end to a folded shroud line, so that pulling stress is applied to said lanyard when said shroud line deploys, cutting said lacing and allowing said deployment bag to expand for unimpeded deployment of said parachute.

4. A deployment bag comprising a parachute container of sufficient size to allow successful deployment of a parachute therefrom, a temporary lacing for compacting said parachute container, means distributed in two substantially spaced rows extending longitudinally of said bag for engaging said lacing, and forming a bellows section therebetween capable of lateral restriction for compacted storing of said deployment bag with the parachute packed therein, a permanent lacing for replacing said temporary lacing, and means for rupturing said lacing to allow said bellows to expand, said means comprising a lanyard having cut knives connected thereto, said cut knives having threaded and cutting relation to said lacing, a section of said lanyard being secured to a shroud line of said parachute, whereby said cut knives are pulled by said lanyard to cut said lacing when said deployment bag is attached to a load and launched.

5. A deployment bag capable of assuming a substantially flat contour for the purpose of packing a parachute therein, means for lacing said bag to assume a cylindrical contour, an inserted pannel member extending the length of said bag, means for lacing the edges of said inserted pannel member together for forming a collapsible bellows thereby drawing said bag into a restricted cylindrical contour for stowing and eliminating the bellows member from the effective contour of said bag, means for cutting said last mentioned lacing means operable by the weight of a load attached to said lacing means to cut said lacing means when the weight of the load is applied thereto as in falling and expanding the said bag to its initial full cylindrical size to allow a parachute to be deployed therefrom.

References Cited in the file of this patent

UNITED STATES PATENTS

| | | |
|---|---|---|
| 1,323,983 | Irvin | Dec. 2, 1919 |
| 2,052,503 | Tricau | Aug. 25, 1936 |
| 2,357,828 | Hurt | Sept. 12, 1944 |
| 2,389,578 | Quilter | Nov. 20, 1945 |
| 2,663,525 | Smith | Dec. 22, 1953 |
| 2,702,679 | Culver | Feb. 22, 1955 |
| 2,749,066 | Barnes et al. | June 5, 1956 |
| 2,760,741 | Tauty | Aug. 28, 1956 |

FOREIGN PATENTS

| | | |
|---|---|---|
| 515,976 | Italy | Feb. 18, 1955 |
| 676,005 | France | Nov. 18, 1929 |
| 1,165,827 | France | June 9, 1958 |